United States Patent [19]
Walters

[11] Patent Number: 5,693,412
[45] Date of Patent: Dec. 2, 1997

[54] GAS IMPERMEABLE, ELASTICALLY DEFORMABLE LAMINATE AND INFLATABLE ARTICLES FORMED THEREFROM

[76] Inventor: William D. Walters, 2230 Biscay Ct., Byron, Calif. 94514

[21] Appl. No.: 271,769

[22] Filed: Jul. 7, 1994

Related U.S. Application Data

[63] Continuation-in-part of Ser. No. 921,237, Jul. 29, 1992, Pat. No. 5,403,123.

[51] Int. Cl.⁶ .................... D03D 3/00; B32B 7/12
[52] U.S. Cl. .................... 428/317.1; 428/317.7
[58] Field of Search ............... 428/230, 317.1, 428/317.7; 405/186; 528/343; 156/324

[56] References Cited

U.S. PATENT DOCUMENTS

| | | | |
|---|---|---|---|
| 2,485,725 | 10/1949 | Francis, Jr. | 154/48 |
| 2,628,928 | 2/1953 | Cadovs | 154/48 |
| 3,219,039 | 11/1965 | Ambrose et al. | 128/521 |
| 3,521,628 | 7/1970 | Piel | 128/142.5 |
| 3,666,595 | 5/1972 | Bauer | 156/324 |
| 3,948,702 | 4/1976 | Theissen | 428/425 |
| 4,009,583 | 3/1977 | Buckle | 9/316 |
| 4,016,616 | 4/1977 | Walters | 9/339 |
| 4,187,390 | 2/1980 | Gore | 428/304 |
| 4,229,472 | 10/1980 | Suskind et al. | 428/113 |
| 4,539,255 | 9/1985 | Sato et al. | 428/252 |
| 4,612,241 | 9/1986 | Wright, III | 9/314 |
| 4,694,772 | 9/1987 | Faulconer et al. | 405/185 |
| 4,725,481 | 2/1988 | Ostapchenko | 428/213 |
| 4,761,324 | 8/1988 | Rautenberg et al. | 428/198 |
| 4,779,554 | 10/1988 | Courtney | 405/186 |
| 4,810,134 | 3/1989 | Faulconer et al. | 405/186 |
| 4,910,085 | 3/1990 | Raniere et al. | 428/412 |

FOREIGN PATENT DOCUMENTS

| | | |
|---|---|---|
| 2021040 | 11/1979 | United Kingdom. |
| 2197627 | 11/1986 | United Kingdom. |
| WO8602613 | 5/1986 | WIPO. |

*Primary Examiner*—Thurman K. Page
*Assistant Examiner*—Kathryne E. Shelborne
*Attorney, Agent, or Firm*—Majestic, Parsons, Siebert & Hsue

[57] ABSTRACT

An inventive laminate is provided useful in forming inflatable articles, such as rafts and kayaks, automobile safety bags, air craft and life saving jackets/vests, diving buoyancy compensator vests, medical therapeutic containers, waders, packaging material, inflatable boots and soles, inflatable shoes and soles, and the like. The laminate includes an elastomer layer capable of repeated two-dimensional stretch and retraction. Opposed to the elastomer layer is a first substantially gas impermeable layer. The two layers are substantially continuously adhered to one another and maintained in laminated form. Products formed from the laminate can be repeatedly stretched and retract to accommodate substantial volume increases due to elastic deformations in response to elevated pressures. Because the laminate is elastically deformable, lower inflation pressures can be used in inflatable clothing articles, such as buoyancy compensators, which results in a more comfortable garment.

34 Claims, 2 Drawing Sheets

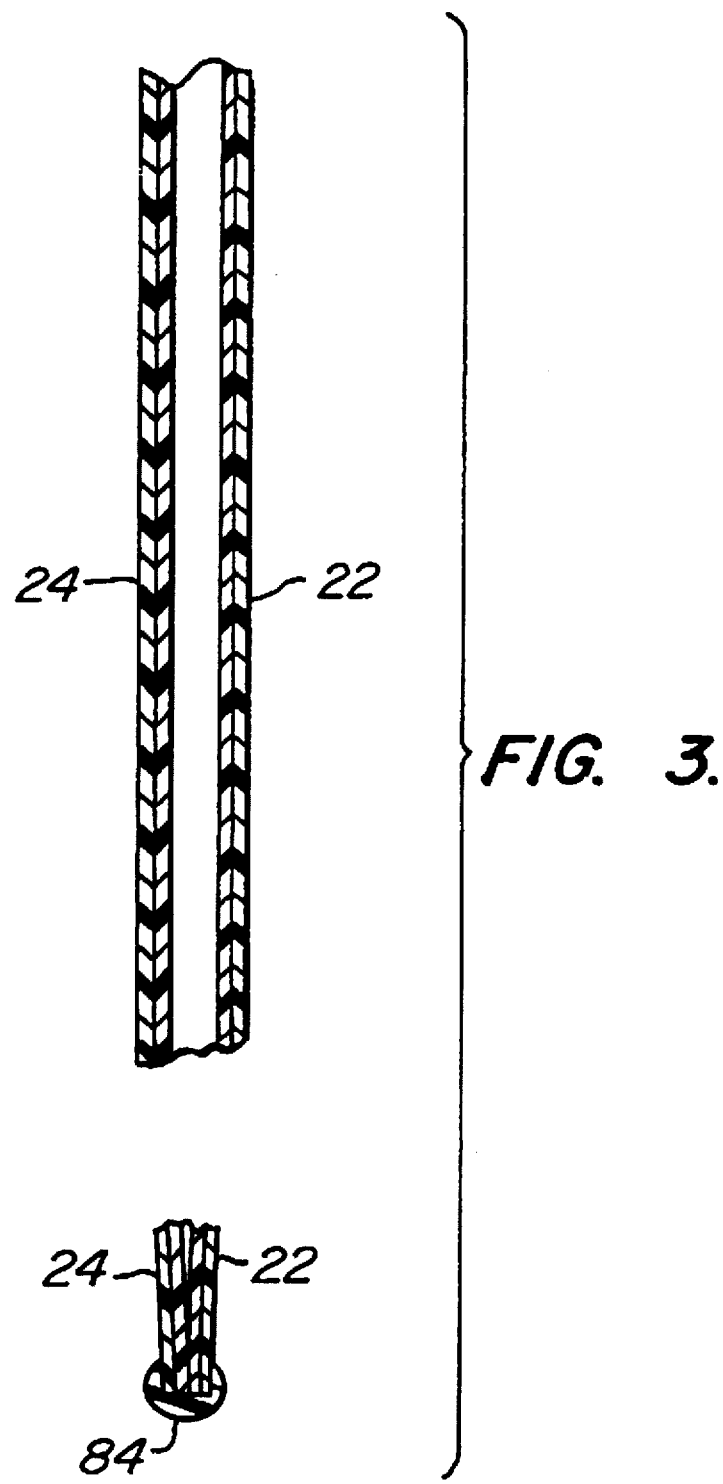

GAS IMPERMEABLE, ELASTICALLY DEFORMABLE LAMINATE AND INFLATABLE ARTICLES FORMED THEREFROM

CROSS-REFERENCE TO RELATED APPLICATION

This is a continuation-in-part application of Ser. No. 07/921,237, filed Jul. 29, 1992 now U.S. Pat. No. 5,403,123.

FIELD OF THE INVENTION

The present invention generally relates to inflatable articles formed of a laminate that is gas impermeable and elastically deformable, and particularly relates to a laminate used in forming a buoyancy compensator vest that is more comfortable to the user due to an ability to use lower inflation pressures.

BACKGROUND OF THE INVENTION

Divers usually wear jackets, or vests, to achieve neutral or slightly positive buoyancy at various depths. The vest typically includes a buoyancy compensator chamber which the diver can selectively pressurize from the diver's air tank in order to adjust buoyancy under water. The buoyancy compensator normally also has an associated pressure relief valve.

Various diving vests with buoyancy compensators are known, such as described by U.S. Pat. No. 4,016,616, issued Apr. 12, 1977, inventor Walters; U.S. Pat. No. 4,561,853, issued Dec. 31, 1985, inventors Faulconer and Langton. However, previous buoyancy compensator devices have tended to be tight, highly inflated in use, and rather uncomfortable, particularly because during exposure to wave impact air is forced out of the associated relief valve which usually means that the chambers are typically inflated to a high pressure level.

One approach to increasing diver comfort has been to provide a soft backpack with a liquid-filled bladder that can be secured to a buoyancy compensator, such as is described by U.S. Pat. No. 4,952,095, issued Aug. 28, 1990, inventor Walters. Another approach (a life jacket design) is described by U.K. Patent Application No. 8725209, published May 25, 1988, in which relatively flat inflatable panels are described.

However, diver comfort remains an objective for which improvements continue to be sought for diving applications.

SUMMARY OF THE INVENTION

Accordingly, it is one object of the present invention to provide a laminate that is substantially gas impermeable and elastically deformable and that can be formed into a wide variety of inflatable articles having different stretch and strength needs, particularly relatively high pressure inflatables having good cycle life.

In one aspect of the present invention, an article comprises a laminate that includes an elastomer layer capable of repeated two-dimensional stretch and retraction. Opposed to the elastomer layer is a first substantially gas impermeable layer, and the two layers are substantially continuously adhered to one another and maintained in laminated form by adhesive means.

In a particularly preferred embodiment of the inventive article, the laminate forms an elastically deformable surface for receiving and containing gas therein, such as buoyancy gas as part of a SCUBA diver's vest, a dry suit or a semi-dry suit. Other embodiments for the inventive laminates include various inflatable articles, such as rafts and kayaks, automobile safety bags, diving suits, swimming learning vests, aircraft and life saving jackets and vests, medical therapeutic containers, waders, packaging material, inflatable boots and soles, inflatable shoes and soles, and the like.

BRIEF DESCRIPTION OF THE DRAWINGS

FIG. 3 is a sectional view in the direction of lines 3—3 of FIG. 2 showing a chamber for containing buoyancy compensating gas.

DETAILED DESCRIPTION OF THE PREFERRED EMBODIMENTS

Figure 1:
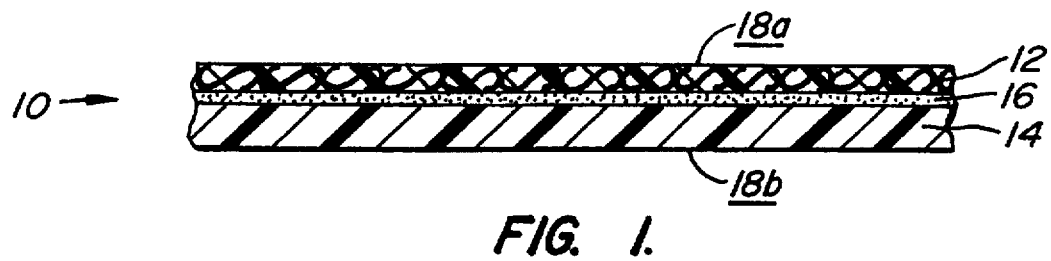
FIG. 1 illustrates, in cross-section, a laminate embodiment of the invention.

Laminates of this invention include an elastomer layer, a substantially gas impermeable layer, and adhesive means for adhering the layers to one another, and can be used to form all or part of a wide variety of articles. With reference to FIG. 1, a laminate embodiment 10 is illustrated with elastomer layer 12, first opposed substantially gas impermeable layer 14, and adhesive means 16 for substantially continuously adhering layers 12, 14 to one another and to form a substantially gas impermeable and elastically deformable surface (actually, two surfaces illustrated as surface 18a and surface 18b). Adhesive means 16 is also for maintaining layers 12, 14 in laminated form when the laminate is repeatedly stretched, such as during inflation.

Suitable elastomers for forming elastomer layer 12 include materials formed by elastomeric fibers, such as spandex fibers, in woven, non-woven, or knit fabrics, which can further include one or more of materials such as nylon and polyester or ether based polyester.

Preferred fibers are selected from the group consisting of polyester elastomers, polyester/polyether elastomers, polyamide/polyester/polyether elastomers, polyester/polyurethane elastomers, polytetramethylene terephthalate and polyester/polyurethane elastomers. More preferably, the fibers are polyester/polyether elastomers. Preferred polyester/polyether elastomers are described in U.S. Pat. Nos. 3,763,109, 3,766,146, and 3,651,014. Polyester/polyether elastomers and polyester/polyurethane elastomers are available commercially from E. I. du Pont de Nemours and Company under the trademarks Hytrel and Lycra.

One preferred material for elastomeric layer 12 is polyester. Among the various suitable commercially available materials that may be used as elastomer layer 12 are, for example, stretchable Nomex fabric the thread of which is available from du Pont and Antron Cordura mixed with spandex fibers ("Spandura"), also available from du Pont. Fabric weight may vary, depending upon particular applications, with a preferred fabric weight range being on the order of about three ounces to about twenty-five ounces per square yard, and particularly preferred being about two and one-half ounces to about sixteen ounces per square yard for forming components of SCUBA diving apparatus, such as a buoyancy compensator.

Another preferred material for the elastomeric layer 12 is a non-woven fabric such as, for example, the fabric sold under the trade name WEARFORCE™, manufactured by E. I. du Pont de Nemours and Company. The WEARFORCE™ fabric may comprise Kevlar, polyester, Lycra and/or nylon.

In addition, the fabric may also have a rubberized base. The advantage of using a fabric such as WEARFORCE™ is that the WEARFORCE™ material has been shown to have a tensile strength which is stronger than other fabrics such as Cordura.

For example, test results have shown that the WEARFORCE™ fabric can be at least three times as strong as Cordura fabric. In one test, WEARFORCE™ fabric weighing 12-ounces/sq. yd. was found to be three times stronger than Cordura fabric weighing 4.5-ounces/sq. yd. Of course, the particular weight of the WEARFORCE™ fabric will vary depending upon its intended application.

Experiments have also shown that WEARFORCE™ fabric absorbs water readily, causing its weight per square inch to increase significantly. To avoid this problem, the present inventive laminate can be formed to have multiple layers of substantially gas impermeable layers sandwiching the WEARFORCE™ material such that moisture cannot penetrate into and be absorbed by the WEARFORCE™ material. Alternatively, in other applications where exposure to water is minimal, the inventive laminate may be formed to have a single, substantially gas impermeable layer laminated to the WEARFORCE™ material.

The formation of a sandwiched laminate is commonly referred to as double coating, wherein both sides of a fabric layer are covered with some sort of gas impermeable coating or layer. The substantially gas impermeable layer may be applied in the form of either a separate layer or a coating, and may be comprised of vinyl, urethane, rubber, or materials having gas impermeable properties. Furthermore, one or more additional layers of material can be applied to the outer surface(s) of the laminate for reasons relating to cosmetics as well as comfort.

The first opposed substantially gas impermeable layer 14 is preferably a continuous polymeric film. Gas transmission properties are generally a function of film thickness, with films of about 0.5 mils PET (polyethylene terephthalate), for example, typically having an oxygen transmission of about 7 cc/100 in²/day. Because the film should be substantially gas impermeable in forming the inventive laminate, a film thickness of at least 1 mil, more preferably at least about 2.5 mils thickness is preferred, with preferred thicknesses typically being between about 7 mils to about 30 mils, more preferably about 7 mils to about 16 mils. Such films are flexible, yet provide substantial strength in preparing inventive laminates.

Also, films with reduced permeability to vapors (that is, films that are substantially gas impermeable for a variety of applications contemplated by this invention) can themselves be composites, such as where one layer is a flexible polymer, such as a polyurethane, polyethylene, ether polyurethane, or polypropylene, while another layer is coated on or coextruded and serves as a barrier layer. Barrier layers can generally be viewed as substantially organic based or substantially inorganic based. For example, U.S. Pat. No. 3,442,686, issued May 6, 1969, describes a film composite in which silicon oxide coatings are deposited on polymers to serve as a barrier layer. This produces barrier coatings on even quite thin polymer films of oxygen transmission rate properties on the order of about 0.2 cc/100 in²/day and similar water vapor transmission rate properties.

It is to be noted that the deformability of the polymeric film increases as its thickness decreases. Therefore, one advantage of a thin polymeric film such as, for example, 1.25 mils, is that the elastic deformation of the film can be up to about 100 percent. Essentially, this means that the film can expand when deformed to almost double its original size. The disadvantage, however, is that the thinner the film, the more breathable it becomes. Therefore, a compromise in film thickness is preferably attained such that its thickness allows for maximum elastic deformation of the film while at the same time maintaining its substantially gas-impermeable characteristics.

Generally, where the thickness of the polymeric film is below 2 mils, a cross-lamination technique is preferably used to form the film. Additionally, in circumstances of heavy pressure such as, for example, 5 psi or more, cross-lamination would again be recommended even for a polymeric film having a thickness greater than 2 mils.

The cross-laminating technique essentially comprises the steps of adhering at least two separate layers of material together to form a single, unitary layer. For example, in the present invention a cross-laminating technique could be used wherein two layers of polymeric film, each having a thickness of approximately 0.625 mils can be combined to form a unitary polymeric film having a thickness of 1.25 mils.

According to the technique of the present invention, at least two urethane films are crosslaminated together to form a unitary polymeric film. The layers are bonded together using a heat-laminating technique without the use of an adhesive. Alternatively, an adhesive may be used if desired. For example, where more than two layers are bonded together, and at least one of the layers is a non-urethane layer, an adhesive should preferably be used to bond the at least one non-urethane layer to the other layers to thereby form a unitary layer of material or film. Cross-laminated products or films are readily available on the marketplace and can be ordered to the specification desired.

The layers 12 and 14 are bonded, or continuously adhered, and maintained in laminated form (that is, do not delaminate) even when the laminate is repeatedly stretched and retracts, such as to accommodate substantial volume increases due to elastic deformations in response to elevated pressures. Thus, the laminate has a good elastic limit for the various applications contemplated without permanent deformation occurring.

The substantially gas impermeable layer, as has been described, will tend to also have some stretchability, but it is believed to be the elastomer layer that primarily provides the necessary two-dimensional stretch and the essential retraction properties so that the inventive laminate can be repeatedly stretched and retract following elastic deformations in use due to elevated pressures. The particular strength and amount of stretchability desired will depend upon the particular application. However, in forming buoyancy compensators one normally encounters elevated pressures in the range of about 0.5 psi to about 8 psi, which can be readily accommodated by a laminate in accordance with this invention.

The adhesive means, or adhesive layer, 16 continuously adheres layers 12, 14 such as by melt bonding or by adhesive bonding, for example by thermal lamination on hot rolled calendaring equipment. Suitable adhesive materials are commercially available, for example, from laminators or combiners, such as Kenyon Laminating Group (Peacedale, R.I.) and Uretek (New Haven, Conn.). A particularly preferred inventive laminate is formed of 100% polyester tubular knit with adhesive from Polyurethane Specialties Co. (Lindhurst, N.J.) through Kenyon Laminating Group, using a 10 mil thick polyurethane ether based film. An adhesive with good resistance to UV, salt water, and within a preferred range of modulus (stretch) between 6,000–10,000 is Uretek, style # nylon 16–71.

Particularly preferred adhesive materials for adhesive bonding are liquid polyether urethanes (which can be dissolved in methyl ethyl ketone). For example, such an adhesive material can be substantially continuously spread on film layer 14 and thereafter elastomeric fabric 12 added and adhered in a heat calendar process. Application can be by known techniques, such as by reverse roll head, by floating head, or by knife over roll head. The latter is particularly preferred. The depth at which a solubilized adhesive, such as an ether based polyurethane dissolved in MEK, penetrated the layer to which it is applied is controllable by the time when cure is commenced. The resultant laminates are RF weldable for preparation in a variety of forms. Alternatively, two or more layers of the inventive laminate 10 may be joined together using a laser-welding technique, as discussed in greater detail below.

When forming the inventive laminate, it is preferable to match the modulus or stretchability of the different layers of material which go into forming the elastic laminate of the present invention. The modulus refers to the "stretchability index" of the material. If two materials which are laminated together have substantially different moduluses, the materials will tend to delaminate as the fabric is repeatedly stretched. By matching the modulus (or the stretchability index) of each material within the laminate, the resulting laminate can be repeatedly stretched without delamination occurring.

In the present invention, it is desirable for the stretchability of the elastomer layer or fabric to substantially match the modulus of the polymeric layer or film. In addition, for optimal conditions, it is preferable to have the adhesive which bonds the two layers together (i.e. the tye coat) to also have a modulus which substantially matches the modulus of the film and the stretchability of the fabric. Furthermore, where additional layers are contemplated in the inventive laminate, it is desirable for such additional layers to also substantially match the modulus or stretchability of the other layers forming the laminate. It is to be noted that, in reality, there may be no actual way to match exactly the modulus of one fabric to another; however, it is preferable to get as close a match as possible. With respect to the laminate of the present invention, such desires have been achieved through much effort and experimentation. Moreover, merely matching the modulus or stretchability of each layer which goes into forming the inventive laminate is not, in and of itself, sufficient to arrive at the laminate of the present invention. Several additional and non-obvious steps are preferably incorporated into the formation process in order to ensure that the inventive laminate will not delaminate during repeated use, and to ensure that the appearance of the laminate is commercially desirable. These steps are described in greater detail below.

As described above, a first step in forming the inventive laminate is to match the modulus of the different layers which form the inventive laminate. This can be done by choosing layers of material which have moduluses that are substantially the same. In other words, the polymeric film should preferably have a modulus which is substantially compatible with the stretchability of the elastomer fabric. When the two layers are combined with, for example, an adhesive tye coat, the tye coat should preferably also have a modulus which is substantially the same as that of the polymeric layer and the stretchability of the elastomer fabric.

A second step, once the appropriate tye coat material is chosen, is the application step of the tye coat to the fabric. This application step should preferably be performed in a precisely controlled way so as to keep the modulus of the adhesive tye coat from changing. To do this, the first step in the application process is to wick the adhesive material into the elastomer layer to a predetermined depth. Such a predetermined depth could be, for example, one-third of the thickness of the material onto which the adhesive is applied. The extent to which the adhesive coating penetrates into the fabric is partially determined by cosmetic reasons, since it is cosmetically undesirable to view the adhesive coating on the opposite side of the fabric. Another factor for determining the depth of penetration is the desirability to have a sufficient amount of the adhesive accessible at the surface of the fabric so that the urethane film which is applied onto it can form an adequate bond with the adhesive.

Next, in order to adhere the polymeric and elastomer layers together, a low heat process such as, for example, a thermal knife and roll process, is used. The advantages of this type of process over other processes such as, for example, a flame roll process, is that the knife and roll technique uses less heat to bond the polymeric, adhesive, and elastomer layers together. The lower the heat, the less likely it is that the urethane layer will wick into the spandex layer. The more that the urethane layer wicks into the spandex layer, the stiffer the resulting laminate becomes, thereby decreasing the stretchability of the laminate. In addition, the deeper the wicking penetrates into the fabric, the more the resulting laminate will tend to delaminate when stretched because each of the layers forming the laminate will tend to move at differing rates. The ultimate goal is to form a laminate wherein the urethane layer, the adhesive, and the spandex layer each moves substantially at the same rate and with substantially the same amount of stretchability.

In one embodiment of the present invention, a spandex layer having a stretchability which substantially matches a modulus 2600 is used. Thus it is desirable to use a urethane film and an adhesive which also have a modulus of about 2600. An example of such a urethane film is the film PT6100 (commonly known under the trade name Dureflex), manufactured by Deerfield Urethane of South Deerfield, Mass. Experimental evidence indicates that the laminate resulting from this example can withstand pressures of up to 27 psi without bursting.

It should be noted that the urethane layer and the tye coat are matched to the stretchability of the elastomer material since the laminate formation process typically starts by choosing a particular elastomer fabric first. It should also be noted that the adhesive should preferably have an adhesion level strong enough to ensure that the polymeric and elastomer layers remain in contact and do not delaminate despite repeated stretching of the laminate.

Where even greater strength is required for a particular application, then an additional layer (not illustrated), also preferably gas impermeable and also preferably polymeric, may be added so that the additional layer either is sandwiched between or on either side of the elastomer layer and the gas impermeable layer. This additional layer is preferably adhered in the sandwiched relationship by the same or a different adhesive process as the previously described laminates. For example, adhesive material 16 can be a solvent based adhesive while the second layer can be calendar heat bonded (that is, fused) to film 14.

In the various applications for inventive laminate 10, either surface 18a or surface 18b can be exposed to the elevated pressure for inflation, although the polymeric layer will typically be exposed to the elevated pressure while the elastomeric layer (defining surface 18a) will be exposed to touch or be adjacent to a wearer's skin for purposes of comfort.

The laminate of the present invention can be used in such applications as diver's jacket, vest, suit, semi-dry suit, dry suit, personal swim float devices, orthopedics, support chambers, swim rafts, surf rafts, inflatable boots and soles, inflatable shoes and soles, and inflatable logos (i.e., logos which are three-dimensional and hold air).

In addition the laminate of the present invention can also be used as part of an inflatable covering or packaging apparatus for protecting any type of delicate package such as, for example, glass, golf clubs, delicate instruments, etc. In other words, the laminate of the present invention can be used in any circumstance where an inflatable, stretchable fabric is helpful for protecting any type of fragile item.

Figure 2:
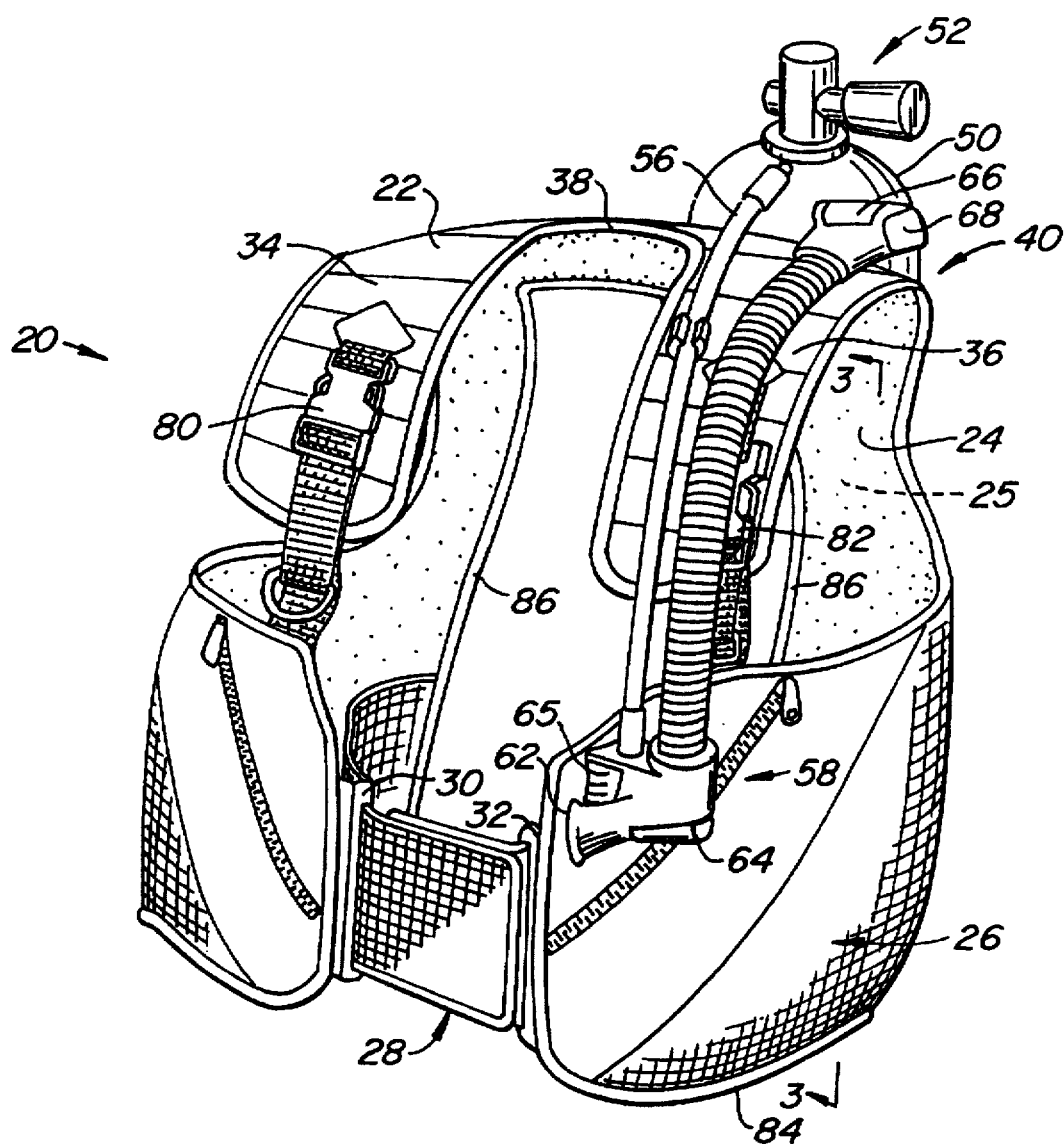
FIG. 2 is a perspective of a buoyancy compensator with which the inventive laminate is useful.

Turning to FIG. 2, a buoyancy compensator 20 is illustrated having opposed walls 22, 24 and with which the inventive laminate is usefully employed. For example, either all or part of wall 22 or all or part of opposed wall 24 can be made from inventive laminate 10.

With reference to FIG. 3, both walls 22, 24 are illustrated as formed from inventive laminate 10 where buoyancy compensator 20 is illustrated as being formed with chamber 25 between the two walls 22, 24. Thus, as illustrated, the buoyancy compensator 20 can be of a single bag construction. In addition, the buoyancy compensator 20 can be of the type (not illustrated) well known to the art by having a double bag, or double wall, where the outer bag generally provides for the maintenance of pressure within the buoyancy compensator while the inner bag, or bladder, provides a maintenance of the air therein in a sealed relationship.

In one particularly preferred embodiment, wall 24, which is in contact with the diver's body includes a soft, strong 100% polyester with a suede-like finish. The opposed wall 22 is formed from the inventive laminate 10. The walls 22, 24 are preferably affixed one to the other to form a chamber for receiving pressurized air, but affixation can also be by various heat sealable processes (such as tape and glue or a vulcanizing hand process).

The buoyancy compensator 20 typically has a waist portion 26, which terminates in attachable belt portion 28. The belt 28 has buckles 30 and 32 (or other fastening means) in order to secure the waist portion 26 around a user's waist. Waist portion 26 will preferably be formed of a woven neoprene in combination with a nylon stretch material, which has neutral buoyancy in water. This material is also preferably used for the shoulder portions 34, 36.

Shoulder portions 34 and 36 define a neck area 38. A harness 40 (illustrated generally at the back) is constructed to receive a backpack (not illustrated) which snugly fits in harness 40 to provide lumbar support and to cradle the SCUBA air tank 50. The air tank 50 has a valve and a regulator, generally shown as valve and regulator 52. The valve and regulator 52 serve to provide breathing gas to the diver wearing buoyancy compensator 20.

Tube 56 is connected to an inflation system 58. The inflation system 58 has a mouthpiece 62 through which a user can inflate the buoyancy compensator orally. Inflation system 58 may comprise a soft-touch power inflator 64, oral inflation button 65, a rapid exhaust valve 66, and an overpressure relief valve 68 which all work together as inflation system 58 and which are preferably surrounded in a protective material, such as a soft elastomer, that conforms to the user's hand and protects the mechanical parts from wear and tear. The soft touch inflator 64 permits control of the air entering the buoyancy compensator 20, while the rapid exhaust valve 66 is readily opened by pulling down on the inflator tube 56. The overpressure relief valve 68 is preferably integrated into the inflation system 58 to allow air to escape quickly in the event of overpressuring the buoyancy compensator 20.

Because the inventive laminate 10 is elastically deformable, the portions of such a buoyancy compensator 20 formed from the inventive laminate are more comfortable to the user due to an ability to use lower inflation pressures, particularly because during exposure to wave impact the elastically deformable surface (such as surface 18a and surface 18b) will tend to deform and the garment itself does not need to be inflated to the typical high pressure levels to compensate for wave action. That is, the deformability feature allows larger wave impact without losing air from a chamber formed by the inventive laminate. This results in a substantially more comfortable garment and the uncomfortable "squeeze" sensation of highly inflated prior art buoyancy compensators is avoided.

Particularly preferred inventive laminate constructions permit volume increases due to elastic deformation on the order of up to about 100 percent in response to elevated pressures, such as within the range of about 0.3 psi to about 25 psi. As will be appreciated, chambers formed by the inventive laminates 10 will be resistant not just to elevated pressures, but more generally will perform as a substantially gas impermeable membrane for pressure difference with respect to the pressures imposed on surfaces 18a, 18b. That is, laminate 10 is substantially gas impermeable even with the pressure difference between a hypothetical pressure $P_a$ (to which surface 18a would be exposed) and a hypothetical pressure $P_b$ (to which surface 18b would be exposed). Thus, inventive laminate 10 could be used to form part or all of a diving suit where the internal suit pressure and the external pressure due to water are adjusted to neutral buoyancy over a pressure difference range beginning at about 0 psi and upwards. Cycle tests with different laminates suggest upper pressure difference values to about 100 psi can be accommodated. Where the inventive laminate 10 is forming a membrane between fluids with one fluid in liquid or solid form, then the elastically deformable surface of the laminate can have a volume variable in response to variable fluid densities, such as in medical therapeutic containers where expansion can be due to a liquid-to-solid transformation.

The ability of the laminate of the present invention to withstand increased pressure is in part due to the weight (per square yard) of the outer cover or elastomer layer 12. Preferably the elastomer layer uses a material having a weight of between 10–16 ounces per sq. yd., which allows the laminate to withstand greater pressure than material having a weight of between 4–8 ounces per sq. yd. In addition, the fiber of the elastomer layer is stronger. For example, aromatic polyamide fibers such as, for example, Kevlar (Trademark: E. I. Du Pont de Nemours & Co.) and/or Nomex (Trademark: E. I. Du Pont de Nemours & Co.) are used in forming the elastomer laminate layer 12.

Again with reference to FIG. 1, typical and preferred aspects of buoyancy compensator 20 include shoulder areas 34 and 36 that are adjustable by means such as buckles 80 and 82 on adjustment straps. The shoulder areas 34,36, as well as pockets and soft backpack, can be RF welded to save labor cost of sewing with the new laminate 10. Additional attachments, fasteners, and the like features as are well known to the art may be included with the buoyancy compensator 20. For example, hooks, straps, loops, buckles, and the like are usefully included (but not illustrated).

The walls 22 and 24 are shown with a sealed periphery 84. As earlier noted with reference to FIG. 3, this seals the outer edges to form an interior chamber 25 between the walls 22 and 24. Buoyancy compensators of the invention can have a plurality of chambers, preferably where such chambers are interconnected and thus at the same pressure.

Returning to FIG. 2, heatset areas 86 can take a variety of forms, shapes, and locations on the article and can be provided by laser welding, radio frequency (RF) welding, ultrasonic welding, thermal heatsealing, or any other suitable sealing process, so that the buoyancy compensator walls 22 and 24 are brought into connection with each other at desired areas of the article to better fit or conform to a user's shape, to accommodate attachments, and the like. Also, the conformation of the buoyancy compensator is retained by the various heatset areas to prevent undue expansion during dives.

As stated previously, two or more layers of the inventive laminate 10 may be joined together using a laser-welding technique. Such a laser-welding technique is described in U.S. Pat. Nos. 4,943,454 and 4,861,404, herein incorporated by reference in their entirety.

Commonly, the laser-welding technique is referred to as laser-enhanced bonding, which technique is available, for example, through the manufacturer, Lightseam Technologies Ltd. of Boulder, Colo. Laser-enhanced bonding has been patented in the U.S. and most industrialized countries. Laser welding can be used in place of conventional welding techniques to join the inventive laminate layers together to form a cavity. In other words, the laser-welding technique can be used where common seams would be found. The laser-welding technique basically comprises the steps of heating urethane pellets to a liquid by using a laser, injecting the urethane liquid onto the surface of the inventive laminate and applying the laser beam to thereby molecularly impregnate the injected urethane into the laminate, and then cooling the urethane. Using this technique, the urethane melted by the laser is impregnated and molecularly bonded to both the elastomer layer and the polymeric film of the laminate.

An advantage of the laser-welding technique over conventional techniques such as RF welding is that the laser-welding technique permits two fabric surfaces to be molecularly welded together even though the surfaces are comprised of materials other than polymers such as urethane. For example, given a laminate which includes two outer layers of spandex material sandwiching an inner urethane layer, RF welding could not be used to weld another piece of the same laminate together with the first piece to form an air-tight chamber since the RF welding technique is not able to weld the two facing spandex layers together to create an airtight chamber. However, the laser-welding technique enables the two fabrics to be bonded together by creating a seam which impregnates the spandex fabrics as well as the urethane film in between, thereby forming an airtight pocket. Additionally, the spandex material would not be harmed by the laser-welding technique. Although any two materials can, in theory, be laserwelded together, it is preferable to use gas-impermeable materials where the formation of an airtight chamber is desired.

Note that one advantage of using urethane in the present invention is that urethane is a non-porous article, which enhances its gas-impermeability characteristics. Typically a solvent is used to molecularly change the surface of the urethane so that two such surfaces can be molecularly bonded together. Adhesives or glues, on the other hand, typically require that the fabric upon which it is used have a porous surface so that the glue can wick into the pours and adhere the different layers together. However, laserwelding achieves a result similar to that of a solvent in that the liquid urethane molecularly bonds with the other urethane layers to thereby join both layers together. In general, any type of bonding technique which heats up urethane to a sufficient level so as to enable the heated urethane to molecularly bond with another layer of urethane will work. An advantage of laser-welding is that the other non-urethane layers of the laminate are not harmed during the urethane heating and bonding processes.

As will be readily understood, the inventive laminate 10 can be desirably utilized in preparing other articles, particularly other inflatable articles, such as rafts and kayaks, automobile safety bags, diving suits, swimming learning vests, aircraft and lifesaving jackets and vests, medical therapeutic containers, waders, and the like. Other buoyancy compensator vests are also known to the art, such as snorkel buoyancy compensators, for which inventive laminate 10 is readily and desirably adapted.

Aspects of the invention will now be further illustrated.

EXAMPLE 1

Testing was performed on various laminate 10 embodiments of the invention. Cycle testing was performed by forming laminate 10 embodiments into pressurized air containing chambers (such as illustrated by FIG. 3), and then repeatedly filling and evacuating the chambers with pressures by a machine that can fill to 20 psi and can evacuate to subatmospheric. An overpressure valve permits positive pressure variations up to 100 psi. Chambers formed from various laminates were initially screened, and then selected laminates were tested at over 10,000 cycles of input (1.5 psi) and exhaust.

A burst test was also used in which pressurized air was input into the chambers up to rupture. Laminates were further subjected to a wash test in which four inch by four inch laminate pieces were subjected to heavy cycle, standard washing machine washing for 50, 100, or 150 cycles and then examined for wear, possible delamination, and color degradations. Ten out of fifty cycles included bleach, and about one-third of the cycles were with hot water, another about one-third with warm water, and a final about one-third with cold water. All cycles included conventional laundry detergent at manufacturers suggested use levels.

Laminates were yet further subjected to impact tests where a drop weight plate machine with a fifteen pound drop weight was used to impact the laminate rapidly and to apply uneven stress to different local areas on chambers formed from the laminates. The laminate forming chambers were then visually inspected for any weaknesses due to the impact tests.

Preferred laminates of this invention perform well under the just described cycle, burst, wash, and impact testing. Several preferred laminate 10 embodiments of the invention, all successfully passing the tests as above described, were prepared as follows.

A laminate embodiment was prepared from 100% knit polyester (style 5270, commercially available from Flynt Amtex, Inc.) weighing 3.9 ounces per square yard, and having a 75% stretchability (both length and width). Adhesive used was obtained from Polyurethane Specialties Co. through Kenyon Laminating Group and Eurotech Incorporated. The substantially gas impermeable layer was 10 mils polyurethane film. The polyester knit and polyurethane film were laminated by means of the adhesive through a heat calendar process, and the resulting laminate gave excellent testing results.

A second laminate embodiment giving good testing results was formed in a similar manner with a nylon and spandex fabric (6 oz., 120 warp, and 80 fill) and either 7 mils or 16 mils polyurethane film.

Yet another laminate embodiment with good test results used Antron Cordura and spandex (7 oz., 120 warp, and 95 fill) as the elastomer layer, while the first substantially gas impermeable layer was 10 mils polymeric film with a second layer being sandwiched between the elastomer layer and first layer by means of adhesive. The second, sandwiched layer can be a stretchable (spandex knit) ballistic type fabric (such as used in bullet-proof vests).

A fourth embodiment was prepared where the inventive laminate was formed from 100% stretch polyester as elastomer and adhered to 10 mils polyurethane film. This laminate was then used to form one wall of a chamber while the other wall was formed from a 10 mil polyurethane film adhered to a non-stretch polyester suede. The two walls were joined into the pressurized air containing chamber by means of a welded joints.

It is to be understood that while the invention has been described above in conjunction with preferred specific embodiments, the description and examples are intended to illustrate and not limit the scope of the invention, which is defined by the scope of the appended claims.

It is claimed:

1. A laminated article comprising:
    at least one elastomer layer capable of repeated two-dimensional stretch and retraction, the elastomer layer including spandex fibers,
    at least one first opposed substantially gas impermeable layer, said gas impermeable layer being formed from a material which has a substantially different molecular structure than that of said elastomer layer; and
    means for substantially continuously adhering said at least one elastomer layer and said at least one gas impermeable layer to one another to thereby form a substantially gas impermeable and elastically deformable laminate and for maintaining the layers in laminated form when the laminate is repeatedly stretched;
    wherein stretchability indices or moduli of said elastomer layer, said gas impermeable layer, and said adhering means are substantially similar.

2. The article of claim 1 wherein said adhering means comprises an adhesive.

3. The article as in claim 1 wherein the elastomer layer is a fabric.

4. The article as in claim 3 wherein said fabric is a woven fabric.

5. The article as in claim 1 wherein said fabric is a non-woven fabric.

6. The article as in claim 1 wherein said fabric is a knit fabric.

7. The article as in claim 1 wherein the fabric includes polyester/polyurethane elastomer fibers and synthetic fibers.

8. The article as in claim 1 wherein the fabric is formed from spandex fibers and at least one material from the group consisting of nylon and polyester.

9. The article as in claim 1 wherein said first layer is a continuous polymeric film at least about 1.25 mils thick.

10. The article as in claim 1, said laminate further comprising at least one elastic second layer, wherein one of the first and second layers is interposed between the elastomer layer and the other of the first and second layer.

11. The article of claim 10 wherein said first layer is sandwiched between said second layer and said elastomer layer.

12. The article as in claim 10 wherein said at least one second layer includes a continuous polymeric film.

13. The article of claim 1 wherein said laminate forms an inflatable article.

14. The article as in claims 1 or 13 wherein the elastically deformable laminate defines a volume variable in response to variable fluid pressures or densities, a maximum volume thereof being increased due to elastic deformation of the laminate.

15. The article as in claim 14 wherein the variable pressures are greater than 14.2 psi.

16. The article as in claim 14 wherein the maximum volume increase due to elastic deformation is up to about 100 percent.

17. The article as in claim 14 wherein an inflatable chamber is formed by at least a part of said laminate.

18. A laminated article comprising:
    at least one elastomer layer capable of repeated two-dimensional stretch and retraction,
    at least one first opposed substantially gas impermeable layer, said gas impermeable layer being formed from a material which has a substantially different molecular structure than that of said elastomer layer; and
    means for substantially continuously adhering said at least one elastomer layer and said at least one gas impermeable layer to one another to thereby form a substantially gas impermeable and elastically deformable laminate and for maintaining the layers in laminated form when the laminate is repeatedly stretched, wherein the elastically deformable laminate defines a volume variable in response to variable fluid pressures or densities, a maximum volume thereof being increased due to elastic deformation of the laminate, and wherein an inflatable chamber is formed by at least a part of said laminate, wherein said inflatable chamber includes radio frequency welds for defining a shape for the chamber;
    wherein stretchability indices or moduli of said elastomer layer, said gas impermeable layer, and said adhering means are substantially similar.

19. A laminated article comprising:
    at least one elastomer layer capable of repeated two-dimensional stretch and retraction,
    at least one first opposed substantially gas impermeable layer, said gas impermeable layer being formed from a material which has a substantially different molecular structure than that of said elastomer layer; and
    means for substantially continuously adhering said at least one elastomer layer and said at least one gas impermeable layer to one another to thereby form a substantially gas impermeable and elastically deformable laminate and for maintaining the layers in laminated form when the laminate is repeatedly stretched, wherein the elastically deformable laminate defines a volume variable in response to variable fluid pressures or densities, a maximum volume thereof being increased due to elastic deformation of the laminate, and wherein an inflatable chamber is formed by at least a part of said laminate, wherein said inflatable chamber includes laser welds for defining a shape for the chamber;
    wherein stretchability indices or moduli of said elastomer layer, said gas impermeable layer, and said adhering means are substantially similar.

20. The article of claim 10 wherein said laminate forms an inflatable article.

21. The article of claim 11 wherein said laminate forms an inflatable article.

22. A laminated article comprising:
   at least one elastomer layer capable of repeated two-dimensional stretch and retraction,
   at least one first opposed, non-cellular, substantially gas impermeable layer, and
   means for substantially continuously adhering said at least one elastomer layer and said at least one gas impermeable layer to one another to thereby form a substantially gas impermeable and elastically deformable laminate and for maintaining the layers in laminated form when the laminate is repeatedly stretched.

23. The article as in claim 22 wherein the elastically deformable laminate defines a volume variable in response to variable fluid pressures or densities, a maximum volume thereof being increased due to elastic deformation of the laminate.

24. The article of claim 23 wherein the laminate can withstand pressures of greater than 14.2 psi without delaminating or rupturing.

25. The article as in claim 23 wherein the the laminate is able to withstand volume increases due to elastic deformation on the order of at least 100 percent without delaminating or rupturing.

26. The article of claim 22 wherein each of said elastomer layer, said gas impermeable layer, and said adhering means has a respective stretchability index or modulus of elasticity, and wherein the stretchability indicies or moduli of said elastomer layer, said gas impermeable layer, and said adhering means are substantially similar to one another.

27. The article of claim 1 wherein said substantially gas impermeable layer comprises polyurethane.

28. The article of claim 22 wherein said substantially gas impermeable layer comprises polyurethane.

29. The article of claim 18 wherein said laminate forms an inflatable article.

30. The article as in claim 18 wherein the variable pressures are greater than 14.2 psi.

31. The article as in claim 18 wherein the maximum volume increase due to elastic deformation is up to about 100 percent.

32. The article of claim 19 wherein said laminate forms an inflatable article.

33. The article as in claim 19 wherein the variable pressures are greater than 14.2 psi.

34. The article as in claim 19 wherein the maximum volume increase due to elastic deformation is up to about 100 percent.

* * * * *